United States Patent [19]

Kijesky et al.

[11] 4,408,284

[45] Oct. 4, 1983

[54] SIGNAL PROCESSING SYSTEM

[75] Inventors: Michael M. Kijesky, Reston, Va.; Charles T. Bogle, Doylestown, Pa.

[73] Assignee: The United States of America as represented by the Secretary of the Navy, Washington, D.C.

[21] Appl. No.: 227,025

[22] Filed: Jan. 19, 1981

[51] Int. Cl.³ .............................................. G06F 7/38
[52] U.S. Cl. .................. 364/485; 324/77 B; 364/724; 364/726
[58] Field of Search ............... 364/484, 485, 572, 724, 364/725, 726; 328/165, 166, 167, 155; 324/77 B, 78 D, 77 E, 78 F, 78 Z

[56] References Cited

U.S. PATENT DOCUMENTS

| | | | |
|---|---|---|---|
| 3,493,874 | 2/1970 | Finkel et al. | 328/167 |
| 3,810,029 | 5/1974 | Barthelmy | 328/167 |
| 3,815,032 | 6/1974 | Parker et al. | 328/167 |
| 3,935,437 | 1/1976 | Schmitt et al. | 364/724 |
| 3,984,669 | 10/1976 | Lehmann et al. | 364/726 |
| 4,012,627 | 3/1977 | Antoniak | 364/724 |
| 4,038,539 | 7/1977 | Van Cleave | 364/724 |
| 4,054,785 | 10/1977 | Lehman | 364/726 |
| 4,286,326 | 8/1981 | Houdard | 364/485 |
| 4,293,921 | 10/1981 | Smith, Jr. | 364/726 |
| 4,303,979 | 12/1981 | Kato et al. | 364/485 |

*Primary Examiner*—Joseph F. Ruggiero
*Attorney, Agent, or Firm*—Robert F. Beers; Henry Hansen; Armand M. Vozzo, Jr.

[57] ABSTRACT

A signal processing system and technique is disclosed for detecting the presence of a desired frequency signal particularly that of a sine wave, in a noisy environment. The signal mixed with noise is received and analyzed by a Fast Fourier Transform spectrum analyzer the output of which is indicative of instantaneous signal phase. The output of the spectrum analyzer is digitally processed to produce a series of average instantaneous signal values based upon the instantaneous signal phase and a statistical estimate of its rate of change, the values being representative of the relative signal strengths for a progression of phase reference values between 0° and 360°. The desired signal is detected when an average instantaneous signal value exceeds a threshold value determined empirically based upon a certain probability of detection and false alarm rate.

11 Claims, 1 Drawing Figure

SIGNAL PROCESSING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to signal analysis and processing, and more particularly to an improved system and technique for detecting sinusoidal wave signals mixed with ambient noise.

In the field of signal analysis and processing, the ideal method for extracting the signal content from a noisy environment is through the use of a matched filter. However, effective employment of matched filters requires a prior knowledge of both signal frequency and phase which are unknown in most signal detection settings. Accordingly, the traditional method for estimating and extracting the signal content in noise, when the signal frequency is unknown, consists of a spectrum analysis using Fast Fourier Transform (FFT) techniques followed by magnitude detection and incoherent integration. This method, which utilizes amplitude characteristics to analyze and detect signal content, provides processing gains that are significant yet not approaching those obtained by way of matched filters.

Theoretically, it has been determined that by utilizing phase characteristics of incoming signals, increased processing gains approaching those of the matched filters can be obtained. On a practical basis, however, two problems have arisen regarding the utilization of signal phase information in signal detection: first, the signal reference phase must be known a priori, and second, the spectrum analyzer from which the phase information is to be generated limits the detection process because the filter employed therein is generally mismatched as to frequency. While the former problem has been solved through the use of multiple phase references, the latter remains a current problem that restricts signal processing sensitivities and limits signal detection ranges.

SUMMARY OF THE INVENTION

Accordingly, it is a general purpose and object of the present invention to provide an improved signal processing system and technique for detecting a sinusoidal wave signal in a noisy background environment.

Another object of the present invention is to provide a signal detection system that effectively utilizes the phase characteristic of incoming signals to enable the extraction of a sine wave from a noisy background.

A further object of the present invention is to provide a signal detection technique that increases signal processing sensitivities and detection ranges by processing the signal phase information provided by a Fast Fourier Transform spectrum analyzer to remove the adverse effects of the mismatch commonly occurring between the incoming signal frequency and the center frequency of the spectrum analyzer filter.

A still further object of the present invention is to provide a signal processing system that is quick and reliable in operation, and economical to manufacture.

Briefly, these and other aspects of the present invention are accomplished by a signal processing system and technique for detecting a sinusoidal signal in a noisy environment. The signal mixed with noise is received and analyzed by a Fast Fourier Transform spectrum analyser the output of which is indicative of instantaneous signal phase. The output of the spectrum analyzer is digitally processed to produce a series of average instantaneous signal values based upon the instantaneous signal phase and a statistical estimate of its rate of change, the values being representative of the relative signal strengths for a progression of phase reference values between 0° and 360°. A desired signal is detected when an average instantaneous signal value exceeds a threshold value determined empirically based upon a certain probability of detection and false alarm rate.

For a better understanding of these and other aspects of the present invention, reference may be made to the following detailed description taken in conjunction with the accompanying drawing in which like reference characters designate like items throughout the figures thereof.

DESCRIPTION OF THE PREFERRED EMBODIMENT

Figure 1:
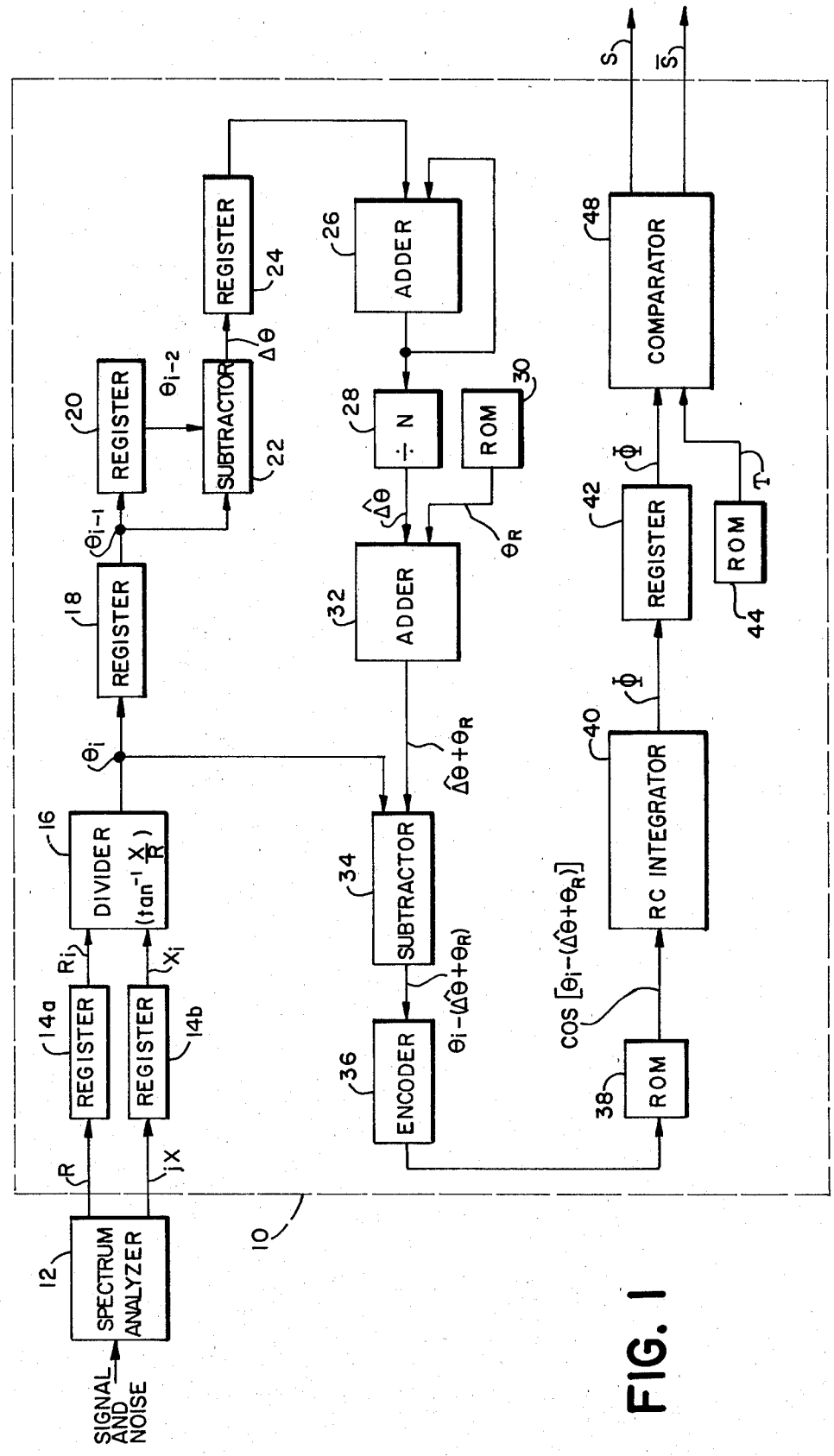
FIG. 1 is a block diagram showing the signal processing system according to the present invention.

Referring to FIG. 1, there is shown a signal processor 10 which, in accordance with the present invention, is connected at its input to a conventional spectrum analyzer 12 of the type employing Fast Fourier Transform (FFT) analyses to determine the frequency energy distribution of incoming signals. The spectrum analyzer 12 receives a time-function signal comprising several frequencies mixed with noise, and samples and processes the signal at a certain rate thereby producing successive samples of real and imaginary magnitude coefficients, R and jX, respectively, in digital form indicative of the real and imaginary components of the incoming signal at a specific frequency. Spectrum analyzer 12 may comprise a plurality of distinct filter cells, each of which is associated with a separate signal frequency so that magnitude coefficients, R and jX, are provided at the output of the analyzer for different frequencies of interest. For the sake of clarity, FIG. 1 shows one channel of the signal processor 10 of the present invention connected to receive magnitude coefficients, R and jX, associated with one cell of spectrum analyzer 12. It should be understood that identical parallel channels of the signal processor 10 may be provided within the scope of the present invention for each of the plurality of cells of spectrum analyzer 12 so that several signal frequencies of interest may be processed at once.

The signal processor 10 receives the real and imaginary magnitude coefficients, R and jX, from spectrum analyzer 12 at digital holding registers 14a and 14b, respectively. The holding registers 14a and 14b temporarily store the successive magnitude coefficients, thereafter transferring instantaneous real and imaginary coefficients, $R_i$ and $X_i$, to a functional divider 16. The functional divider 16 performs the inverse tangent function on the quotient of the instantaneous imaginary coefficient $X_i$ and the real coefficient $R_i$ thereby determining the instantaneous phase $\theta_i$ of the input signal and producing an output signal indicative thereof.

The instantaneous phase $\theta_i$ of the input signal being analyzed by spectrum analyzer 12 generally experiences a change ($\Delta\theta_i$) between successive output samples from the analyzer. Commonly called phase roll, this change in the instantaneous phase value $\theta_i$ results from the typical frequency mismatch occurring between the input signal and the center frequency of the cell of spectrum analyzer 12, and is functionally described by the equation $$\Delta\theta_i = \pm \frac{f_i - f_o}{\Delta f} \pi$$

where $f_i$ is the input signal frequency $f_o$ is the center frequency of the cell, and $\Delta f$ is the FFT resolution of the spectrum analyzer. Accordingly, if the change in the instantaneous phase $\theta_i$ between successive output samples is evaluated and compensated for, the frequency mismatch and its adverse effects can be eliminated thereby enhancing signal detection.

Signal processor 10 evaluates the variations in the instantaneous phase $\theta_i$ based upon a statistical estimate $$\Delta\hat{\theta} = \frac{1}{n} \Sigma (\theta_i - \theta_{i+1}).$$

A pair of digital registers 18 and 20 are connected in series to receive the successively-generated instantaneous phase values $\theta_i$, $\theta_{i+1}$, $\theta_{i+2}$, ... for temporary storage and transfer. Register 18 directly receives the instantaneous phase value $\theta_i$ from functional divider 16 and temporarily stores this value while transferring the immediately preceeding phase value $\theta_{i-1}$ to register 20. Register 20 similarly stores phase value $\theta_{i-1}$, transferring a further preceeding phase value $\theta_{i-2}$ to a digital subtractor circuit 22 which is also connected to receive the first preceeding phase value $\theta_{i-1}$ from register 18. Subtractor circuit 22 is a conventional digital circuit for evaluating the difference between the earlier phase value $\theta_{i-2}$ received from register 20 and the later phase value $\theta_{i-1}$ received from register 18, and for producing a digital output $\Delta\theta$ indicative of the phase differential. A digital register 24 is connected to receive the phase differential output $\Delta\theta$ from subtractor circuit 22 for temporary storage and transfer to an adder circuit 26. Adder circuit 26 is a conventional circuit wired in a recirculating mode for summing the phase differential outputs $\Delta\theta$ received in succession from subtractor circuit 22 via register 24. The summer output from adder circuit 26 is fed to a conventional normalizer 28 in order to yield a digital output signal $\Delta\hat{\theta}$ representative of the statistical estimate of phase variation.

A read-only memory (ROM) 30 stored with a plurality of phase reference values $\theta_R$ is connected to feed the values in a parallel fashion to a conventional adder circuit 32. The phase reference values $\theta_R$, preferably about seven in number, are distinct angles in an increasing progression between 0° and 360° used to provide a series of approximations of initial signal phase. It should be noted that a higher number of phase reference values $\theta_R$ permits a finer signal resolution and a greater probability of "lock-up" to the instantaneous signal phase $\theta_i$. However, increasing the number of phase reference values $\theta_R$ also increases the false alarm rate of the processor 10, and therefore the number of such phase reference values is selected to provide the highest probability of signal detection with a reasonably low false alarm rate.

Adder circuit 32 is connected to receive the statistical estimate of phase variation signal $\Delta\hat{\theta}$ from normalizer 28 and the parallel series of phase reference values $\theta_R$ from ROM 30. The adder circuit 32 simultaneously sums each phase reference value $\theta_R$ and the current phase variation signal $\Delta\hat{\theta}$ thereby producing a continuously updated set of phase reference values $(\Delta\hat{\theta}+\theta_R)$ for comparison with the instantaneous signal phase $\theta_i$. The set of updated phase reference values $(\Delta\hat{\theta}+\theta_R)$ are provided to a conventional subtractor circuit 34, similar to circuit 22, which also receives the instantaneous signal phase $\theta_i$ from functional divider 16. Subtractor circuit 34 performs simultaneous subtraction of each of the set of updated phase reference values $(\Delta\hat{\theta}+\theta_R)$ from the instantaneous signal phase $\theta_i$, producing at its output a series of phase differential values $[\theta_i-(\Delta\hat{\theta}+\theta_R)]$ equal in number to the number of phase reference values $\theta_R$. A digital encoder circuit 36 of a conventional design is connected to receive at its input the series of phase differential values $[\theta_i-(\Delta\hat{\theta}+\theta_R)]$. Encoder circuit 36 sorts and processes the input phase differential values $[\theta_i-(\Delta\hat{\theta}+\theta_R)]$ thereby generating a set of address signals at its output corresponding to each of the phase differential values received from subtracter circuit 34.

A read-only memory (ROM) 38 having a cosine function stored therein is connected to the output of encoder circuit 36. Each address in ROM 38 corresponds to a value of the cosine function associated with a particular phase differential value $[\theta_i-(\Delta\hat{\theta}+\theta_R)]$ so that upon being addressed by the output signals from encoder circuit 36, an appropriate phase cosine value cos $[\theta_i-(\Delta\hat{\theta}+\theta_R)]$ is produced at the output of the ROM. Since encoder circuit 36 is connected to provide a plurality of address signals simultaneously to ROM 38 depending upon the number of phase reference values employed, the ROM will produce a similar number of phase cosine values cos $[\theta_i-(\Delta\hat{\theta}+\theta_R)]$ at its output.

A conventional RC integrator circuit 40 is connected to receive the output from ROM 38 for determining therefrom a series of average instantaneous signal values $\Phi$, one for each of the phase reference values $\theta_R$ being used, and for producing outputs indicative thereof. Each of the average instantaneous signal values $\Phi$ is determined by integrator circuit 40 over a certain period based on the time constant (RC), and is given by the following equation:

$$\Phi = \frac{1}{n} \Sigma \cos [\theta_i - (\Delta\hat{\theta} + \theta_R)].$$

It should be noted that the average instantaneous signal value $\Phi$ peaks as the updated reference value $(\Delta\hat{\theta}+\theta_R)$ approaches the instantaneous signal phase $\theta_i$, and accordingly, serves as a detection statistic representative of relative signal strength for each of the phase reference values $\theta_R$ used.

A digital register 42 is connected to the output of the RC integrator circuit 40 for storage and delayed transmission of the average instantaneous signal values $\Phi$ to a conventional comparator circuit 48. A read-only memory device 44, similar to ROMS 30 and 38, is loaded with a predetermined signal threshold value Y and is connected to feed the threshold value to comparator circuit 48 in synchronization with the average instantaneous signal values $\Phi$ from register 42. The signal threshold value Y is established empirically to insure a high probability of signal detection for a given false alarm rate tolerance. For example, for a false alarm rate tolerance of one in ten thousand ($10^{-4}$) and a 50% probability of detection, the signal threshold value Y is equal to $3.77\sigma_N$, where $\sigma_N$ is the standard deviation for gaussian noise. Such a value of $Y(3.77\sigma_N)$ is equivalent to an output signal-to-noise ratio of about 11.5 db. Generally, the greater the false alarm rate tolerance of the system ($10^{-3} > 10^{-4}$), the lower the signal threshold value Y that may be established.

Comparator circuit 48 compares each of the average instantaneous signal values Φ from register 42 with the selected signal threshold value Y from ROM 44 to provide an indication of the presence of a desired signal frequency. Based upon its comparison, comparator circuit 48 may generate an output signal on line S to indicate detection of the desired signal frequency or a non-detection signal on output line $\bar{S}$. If at least one of the average instantaneous signal values Φ exceeds the threshold signal value Y, then the detection signal will be provided on output line S of comparator circuit 48. Otherwise, comparator circuit 48 will provide no signal on output line S, but rather will provide a signal indicative of non-detection on output line $\bar{S}$. It should be noted that both output lines S and $\bar{S}$ of comparator circuit 48 may be connected to a conventional display (not shown) for signaling an operator to initiate signal extraction operations.

In operation, having received real and imaginary signal coefficients, R and jX, from spectrum analyzer 12, signal processor 10 provides a digital indication of instantaneous phase $\theta_i$ of the incoming signal at functional divider 16. Via registers 18, 20, and 24, and subtractor 22, phase differential output $\Delta\theta$ is produced and transferred to recirculating adder circuit 26 and normalizer 28 to produce digital signal $\Delta\hat{\theta}$ representative of the statistical estimate of phase variation. Adder circuit 32 sums the phase variation signal $\Delta\hat{\theta}$ from normalizer 28 with each phase reference value $\theta_R$ provided by ROM 30 to produce updated phase reference values $(\Delta\hat{\theta}+\theta_R)$. Subtractor circuit 34 subtracts each of the updated reference values $(\Delta\hat{\theta}+\theta_R)$ from the instantaneous phase signal $\theta_i$ received from functional divider 16 thereby providing the series of phase differential values $[\theta_i-(\Delta\hat{\theta}+\theta_R)]$ to encoder circuit 36.

Encoder circuit 36 generates a set of address signals corresponding to each of the phase differential values $[\theta_i-(\Delta\hat{\theta}+\theta_R)]$ received from subtractor circuit 34, the address signals being provided to cosine ROM 38. Upon being addressed by the signals from encoder circuit 36, ROM 38 transfers appropriate cosine phase values cos $[\theta_i-(\Delta\hat{\theta}+\theta_R)]$ stored therein to RC integrator circuit 40 which sums the cosine phase values received over a period for each of the phase references $\theta_R$ used, producing a series of average instantaneous signal values Φ that are a maximum when the updated phase reference value $(\Delta\hat{\theta}+\theta_R)$ is equal to the instantaneous signal phase $\theta_i$. Representative of relative signal strength for the respective phase reference value $\theta_R$ used, each of the average instantaneous signal values Φ is compared with an empirically determined threshold value T by comparator circuit 48 to indicate the presence of the desired signal frequency whenever the average instantaneous signal value exceeds the threshold value.

Therefore, it is apparent that the disclosed signal processor 10 provides an improved system and technique for detecting the presence of a desired frequency signal, particularly that of a sine wave, in a noisy background environment by utilizing the phase characteristics of incoming signals as a detection statistic. In addition, the disclosed invention increases signal processing sensitivities and detection ranges by processing the signal phase information provided by a Fast Fourier Transform spectrum analyser to remove the adverse effects of the mismatch commonly occurring between the frequencies of the incoming signals and the center frequencies of the spectrum analyzer filters. Furthermore, the present invention provides a signal detection system that is quick and reliable in performance and economical to manufacture.

Obviously, other embodiments and modifications of the present invention will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed is:

1. A system for detecting the presence of a desired signal frequency in a multi-signal environment, comprising:

spectrum analyzer means adapted to sample the multi-signal environment for providing digital information indicative of real and imaginary magnitude components of the desired signal frequency;

phase determinator means connected to receive the digital information from said spectrum analyzer means for producing a first digital signal indicative of the instantaneous phase of the desired signal frequency;

phase precession means connected to said phase determinator means for producing a second digital signal representative of a statistical estimate of phase variation of the desired signal frequency;

a first fixed storage device adapted to provide a plurality of third digital signals representative of distinct phase reference values between 0° and 360°;

an adder connected to said phase precession means and said first fixed storage device for summing the second digital signal with each of the plurality of third digital signals thereby producing a plurality of fourth digital signals representative of revised phase reference values;

cosine integrator means connected to said phase determinator means and said adder for producing a plurality of fifth digital signals representative of relative signal strength for each of the phase reference values;

a second fixed storage device adapted to provide a sixth digital signal representative of a threshold signal value; and a comparator connected to said cosine integrator means and said second fixed storage device for indicating the presence of the desired signal frequency when any of the plurality of fifth digital signals exceeds the sixth digital signal.

2. A signal detection system according to claim 1, wherein said phase determinator means comprises:

a pair of registers connected in parallel to said spectrum analyzer means for holding digital information indicative of real and imaginary magnitude components of the desired signal frequency; and functional divider means connected to said pair of digital registers for performing an inverse tangent operation on the quotient of the imaginary and real magnitude components.

3. A signal detection system according to claim 1, wherein said phase precession means comprises:
 a pair of registers connected in series of said phase determinator means for storing successively produced first digital signals;
 a subtractor connected to each of said pair of registers for producing a digital output signal indicative of a change in the instantaneous phase of the desired signal frequency;
 a recirculating adder coupled to said subtractor for summing the digital output signals thereof; and
 a normalizer connected to said recirculating adder for producing the second digital signal.

4. A signal detection system according to claim 1, wherein said cosine integrator means comprises:
 a subtractor connected to said phase determinator means and said adder for subtracting each of the plurality of fourth digital signals from the first digital signal thereby producing a plurality of phase differential outputs;
 a read-only memory coupled to said subtractor and stored with cosine values for producing a plurality of cosine output signals, each cosine output signal corresponding to one of the plurality of phase differential outputs; and
 an integrator connected to said read-only memory for integrating each of the plurality of cosine output signals over a time period.

5. A signal detection system according to claim 4, wherein said first and second fixed storage devices are read-only memories.

6. A signal detection system according to claim 5, wherein said spectrum analyzer means is a Fast Fourier Transform Spectrum analyzer.

7. A signal processor for detecting the presence of a desired signal frequency in a multi-signal environment sampled by a Fast Fourier Transform spectrum analyzer, comprising:
 phase determinator means connected to the spectrum analyzer for producing a first digital signal indicative of the instantaneous phase of the desired signal frequency;
 phase precession means connected to said phase determinator means for producing a second digital signal representative of a statistical estimate of phase variation of the desired signal frequency;
 a first fixed storage device adapted to provide a plurality of third digital signals representative of distinct phase reference values between 0° and 360°;
 an adder connected to said phase precession means and said first fixed storage device for summing the second digital signal with each of the plurality of third digital signals thereby producing a plurality of fourth digital signals representative of revised phase reference values;
 cosine integrator means connected to said adder for producing a plurality of fifth digital signals representative of relative signal strength for each of the phase reference values;
 a second fixed storage device adapted to provide a sixth digital signal representative of a threshold signal value; and
 a comparator connected to said cosine integrator means and said second fixed storage device for indicating the presence of the desired signal frequency when any of the plurality of fifth digital signals exceeds the sixth digital signal.

8. A signal processor according to claim 7, wherein said phase determinator means comprises:
 a pair of registers connected in parallel to said spectrum analyzer means for holding digital information indicative of real and imaginary magnitude components of the desired signal frequency; and
 functional divider means connected to said pair of digital registers for performing an inverse tangent operation on the quotient of the imaginary and real magnitude components.

9. A signal processor according to claim 7, wherein said phase precession means comprises:
 a pair of registers connected in series to said phase determinator means for storing successively produced first digital signals;
 a subtractor connected to each of said pair of registers for producing a digital output signal indicative of a change in the instantaneous phase of the desired signal frequency;
 a recirculating adder coupled to said subtractor for summing the digital output signals thereof; and
 a normalizer connected to said recirculating adder for producing the second digital signal.

10. A signal processor according to claim 7, wherein said cosine integrator means comprises:
 a subtractor connected to said phase determinator means and said adder for subtracting each of the plurality of fourth digital signals from the first digital signal thereby producing a plurality of phase differential outputs;
 a read-only memory coupled to said subtractor and stored with cosine values for producing a plurality of cosine output signals, each cosine output signal corresponding to one of the plurality of phase differential outputs; and
 an integrator connected to said read-only memory for integrating each of the plurality of cosine output signals over a time period.

11. A signal processor according to claim 10, wherein said first and second fixed storage devices are read-only memories.

* * * * *